UNITED STATES PATENT OFFICE.

FRIEDRICH RASCHIG, OF LUDWIGSHAFEN-ON-THE-RHINE, GERMANY.

CHEMICAL PRODUCT RESEMBLING CELLULOID AND PROCESS FOR PRODUCING THE SAME.

No. 900,204.      Specification of Letters Patent.      Patented Oct. 6, 1908.

Application filed June 27, 1906. Serial No. 323,721.

*To all whom it may concern:*

Be it known that I, FRIEDRICH RASCHIG, manufacturer, a subject of the German Emperor, residing at Ludwigshafen-on-the-Rhine, Germany, have invented a certain new and useful Chemical Product Resembling Celluloid and Process for Producing the Same, of which the following is a specification.

For many years manufacturers of celluloid have endeavored to replace camphor, which was considered absolutely necessary for their purposes, by other chemical products, partly because camphor is gradually becoming more expensive, and partly because the peculiar smell of camphor, which somewhat adheres even to the best celluloid, is an obstacle to the general use of celluloid.

None of the substitutes hitherto proposed has succeeded in superseding the camphor, the celluloid made by their aid was much inferior to that produced with camphor, as regards hardness, suppleness, elasticity and transparency. The reason for this want of success seems to be, that a substance which, when worked up with nitro cellulose, is to yield a good celluloid, must possess the following qualities:—Firstly it must dissolve nitro-cellulose, and secondly it must have a certain chemical affinity to nitro-cellulose, which keeps the two materials permanently together. The former quality is found with many organic compounds which have been proposed as camphor substitutes; all of them, however, seem to lack the second quality, which hitherto has been observed in camphor alone. I have discovered, that a similar chemical affinity exists also between nitro-cellulose and certain organic compounds, whose constitution is similar to that of camphor, that is to say, the products obtained by the reduction of phenol, cresols and xylenols, which are known to science under the names of cyclohexanols and cyclohexanones.

If we compare the constitution of the 1-methyl-cyclohexanol (2), which is also known as hexa-hydro-o-cresol (*a*) with the constitution of Borneo-camphor (*b*)

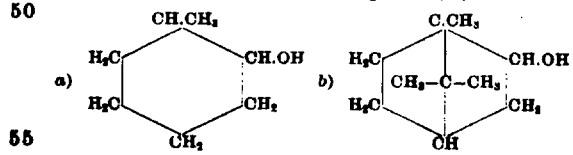

it will be seen, that they differ only by the remnant $CH_3 - \overset{\|}{C} - CH_3$, and the same is the case with regard to the 1-methyl-cyclohexanone (2) and ordinary camphor.

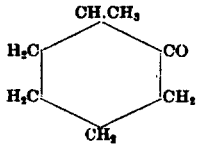 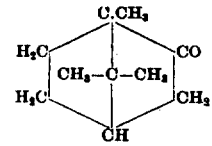

These two cyclo-compounds, which are obtained in mixture with each other by heating ortho-cresol with hydrogen in the presence of metallic nickel, possess a strong solvent power especially for nitro-cellulose, and also a tendency to remain united with it. Moreover, they do not possess the unpleasant smell of camphor, but an agreeable odor resembling that of peppermint. They are therefore eminently suitable for replacing the camphor and yield a beautiful hard and transparent or translucent celluloid, which has a faint but pleasant odor.

The same advantageous properties are possessed by the products obtainable in a similar manner by the reduction of phenol, meta- and para-cresol and the xylenols.

The different hexanones and hexanols may, of course, be prepared separately and then combined with nitro-cellulose, but as all of them yield a good celluloid, the best and cheapest method of manufacture consists in taking commercial crude carbolic acid, which consists of a mixture of phenol with the three cresols and with some xylenol, to subject the said acid to reduction and using the resultant mixture of cyclo-hexanone and cyclo-hexanol with their homologues without previous separation, for the manufacture of celluloid by means of nitro-cellulose. Mixtures of these cyclo-bodies with camphor may, of course, be used for the same purpose, that is to say, if desired a portion only of the camphor in the celluloid may be replaced by the new compounds mentioned above.

What I claim is:—

1. The improvement in the manufacture of chemical products resembling celluloid, which consists in replacing the camphor by cyclo-hexanone, substantially as described.

2. The improvement in the manufacture of chemical products resembling celluloid, which consists in replacing a portion of the camphor by cyclo-hexanone, substantially as described.

3. As a new chemical product, a hard, transparent and slightly aromatic body resembling celluloid and obtainable from nitro-cellulose and cyclo-hexanone, substantially as described.

4. As a new chemical product, a hard, transparent and slightly aromatic body resembling celluloid, and obtainable from nitro-cellulose, camphor and cyclo-hexanone, substantially as described.

In testimony whereof I have set my hand hereunto in the presence of two subscribing witnesses.

FRIEDRICH RASCHIG.

Witnesses:
R. GERLACH,
J. NIVEN-JACK.